(12) United States Patent
Watanabe et al.

(10) Patent No.: US 7,829,605 B2
(45) Date of Patent: Nov. 9, 2010

(54) ENERGY RAY-CURABLE RESIN COMPOSITION AND ADHESIVE USING SAME

(75) Inventors: Jun Watanabe, Shibukawa (JP);
Kimihiko Yoda, Shibukawa (JP);
Kazuhiro Oshima, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 134 days.

(21) Appl. No.: 11/915,809

(22) PCT Filed: May 30, 2006

(86) PCT No.: PCT/JP2006/310812

§ 371 (c)(1),
(2), (4) Date: Nov. 28, 2007

(87) PCT Pub. No.: WO2006/129678

PCT Pub. Date: Dec. 7, 2006

(65) Prior Publication Data

US 2009/0030107 A1    Jan. 29, 2009

(30) Foreign Application Priority Data

May 31, 2005 (JP) .................. 2005-159146

(51) Int. Cl.
*C08F 2/50* (2006.01)
*C08F 2/46* (2006.01)
*C08J 3/28* (2006.01)

(52) U.S. Cl. .......................... 522/120; 522/81; 522/100; 522/113; 522/114; 522/148; 522/158; 522/159; 522/171; 522/172; 522/183; 522/181; 522/184; 522/182; 522/185; 522/186; 522/178; 522/150; 522/153; 522/154; 522/157

(58) Field of Classification Search ................. 522/100, 522/113, 148, 158, 159, 171, 172, 183, 114, 522/120, 150, 153, 154, 157, 178, 181, 182, 522/184, 185, 186
See application file for complete search history.

(56) References Cited

FOREIGN PATENT DOCUMENTS

| JP | 56-16561 | 2/1981 |
|---|---|---|
| JP | 1-207371 | 8/1989 |
| JP | 7-13173 | 1/1995 |
| JP | 7-13174 | 1/1995 |
| JP | 7-13175 | 1/1995 |
| JP | 7-118369 | 5/1995 |
| JP | 7-138332 | 5/1995 |
| JP | 9-194547 | 7/1997 |
| JP | 09194547 A * | 7/1997 |
| JP | 9-302053 | 11/1997 |
| JP | 09302053 A * | 11/1997 |
| JP | 11-147921 | 6/1999 |
| JP | 2000-234043 | 8/2000 |
| JP | 2001-55420 | 2/2001 |
| JP | 2006-225460 | 8/2006 |

* cited by examiner

*Primary Examiner*—Sanza L McClendon
(74) *Attorney, Agent, or Firm*—Oblon, Spivak, McClelland, Maier & Neustadt, L.L.P.

(57) ABSTRACT

An energy ray-curable resin composition comprising (A) a (meth)acrylate having a molecular weight of from 500 to 5,000, of which the main chain backbone is at least one member selected from the group consisting of a polybutadiene, a polyisoprene and hydrogenated products thereof and which has at least one (meth)acryloyl group at an end of the main chain backbone or in a side chain, (B) a monofunctional (meth)acrylate having a $C_{2-8}$ unsaturated hydrocarbon group via an ester bond, (C) a hydroxyl group-containing (meth)acrylate, (D) a polyfunctional (meth)acrylate, (E) a photopolymerization initiator, and (F) an antioxidant which exhibits equally high adhesive strength to various objects to be bonded, has good heat and moisture resistance, excellent rigidity, low cure shrinkage and little adhesion strain is provided.

14 Claims, No Drawings

ENERGY RAY-CURABLE RESIN COMPOSITION AND ADHESIVE USING SAME

CROSS-REFERENCE TO RELATED APPLICATIONS

The present application is a 35 U.S.C. §371 National Stage patent application of International patent application PCT/JP06/310812, filed on May 30, 2006, which claims priority to Japanese patent application JP 2005-159146, filed on May 31, 2005.

TECHNICAL FIELD

The present invention relates to an energy ray-curable resin composition. More particularly, it relates to an energy ray-curable resin composition having a low cure shrinkage and little adhesion strain, and an adhesive, bonded assembly or cured product using the same.

BACKGROUND ART

In the optoelectronics field, along with the trend for high performance of instruments, cases are increasing wherein bonding is carried out between various different materials as objects to be bonded, such as between glass materials, between glass and metal, between glass and ceramic, between glass and plastic, between plastics, between plastic and metal, and between plastic and ceramic. And, for bonding between such various different materials, an adhesive exhibiting a high bond strength and having good heat resistance and moisture resistance, is desired.

Particularly, in bonding between various different materials, an influence of an internal stress caused by e.g. a cure shrinkage of the adhesive over the respective objects to be bonded, is not negligible, and it is desired to develop an adhesive having a low cure shrinkage and little adhesion strain.

In such a trend of technology, adhesives in this field have been changed, taking mass production into consideration, from thermosetting epoxy adhesives to fast curing w-acrylic adhesives or epoxy adhesives.

For example, Patent Documents 1 and 2 disclose urethane acrylate w-curable liquid crystal sealing agents to seal liquid crystal panels; Patent Document 3 discloses an epoxy acrylate UV-curable liquid crystal sealing agent; and Patent Document 4 discloses an epoxy UV-curable adhesive. Further, Patent Document 5 proposes a waterproof adhesive composition having 2-hydroxyethyl methacrylate as one component, as an adhesive composition excellent in water resistance, and Patent Document 6 discloses an UV-curable composition suitable for bonding molded products made of a thermoplastic norbornene resin.

Patent Document 1: JP-A-7-13173
Patent Document 2: JP-A-7-13174
Patent Document 3: JP-A-7-13175
Patent Document 4: JP-A-7-118369
Patent Document 5: JP-A-1-207371
Patent Document 6: JP-A-7-138332

DISCLOSURE OF THE INVENTION

Problems to be Solved by the Invention

However, the UV-curable adhesives disclosed in Patent Documents 1 to 4 have a drawback that when an object to be bonded is a cycloolefin type plastic material having a low birefringence, excellent transparency and low hygroscopicity, no adequate shear bond strength can be secured. Whereas, the waterproof adhesive disclosed in Patent Document 5 has a problem that the tensile bond strength after the moisture resistance test tends to be low and an internal stress caused during curing of the adhesive is substantial. Further, the UV-curable composition disclosed in Patent Document 6 is disclosed to have a bond strength between a thermoplastic norbornene resin and aluminum as different materials, but there is no disclosure of the bond strength relating to other objects to be bonded.

Thus, the conventional adhesive compositions may not sometimes show an adequate bond strength depending upon the type of the object to be bonded, and none of them has shown equally high bond strength to various objects to be bonded. Further, none of them simultaneously satisfies a high bond strength as well as good heat resistance and moisture resistance and a low cure shrinkage.

The present invention has been made in view of such prior art, and it is an object of the present invention to provide an energy ray-curable resin composition which exhibits an equally high bond strength to various objects to be bonded, such as glasses, metals, plastics, etc. and which has good heat resistance and moisture resistance and is excellent also in rigidity, particularly an energy ray-curable resin composition having a low cure shrinkage and little adhesion strain.

Means to Solve the Problems

The present inventors have conducted an extensive study to solve the above problems and as a result, have found that the above object can be accomplished by a resin composition comprising a diene or a hydrogenated diene (meth)acrylate having a molecular weight of from 500 to 5,000, a monofunctional (meth)acrylate having an unsaturated hydrocarbon group of a specific structure via an ester bond, a hydroxyl group-containing (meth)acrylate, a polyfunctional (meth)acrylate, a photopolymerization initiator and an antioxidant. The present invention has been accomplished on the basis of this discovery.

The present invention provides the following.

(1) An energy ray-curable resin composition comprising Components (A) to (F), wherein Component (A) is a (meth)acrylate having a molecular weight of from 500 to 5,000, of which the main chain backbone is at least one member selected from the group consisting of a polybutadiene, a polyisoprene and hydrogenated products thereof and which has at least one (meth)acryloyl group at an end of the main chain backbone or in a side chain, Component (B) is a monofunctional (meth)acrylate having a $C_{2-8}$ unsaturated hydrocarbon group via an ester bond, Component (C) is a hydroxyl group-containing (meth)acrylate, Component (D) is a polyfunctional (meth)acrylate, Component (E) is a photopolymerization initiator, and Component (F) is an antioxidant.

(2) The energy ray-curable resin composition according to the above (1), which further contains, as Component (G), a monofunctional (meth)acrylate having a $C_{9-12}$ saturated alicyclic hydrocarbon group via an ester bond.

(3) The energy ray-curable resin composition according to the above (1) or (2), wherein ratio X/Y of mass amount X of Component (B) to mass amount Y of Component (G) is within a range of $0.5 \leq X/Y \leq 15$.

(4) The energy ray-curable resin composition according to any one of the above (1) to (3), which further contains, as Component (H), a (meth)acrylate having a carboxyl group or a phosphate group.

(5) The energy ray-curable resin composition according to any one of the above (1) to (4), which further contains, as Component (I), a silane coupling agent.

(6) The energy ray-curable resin composition according to any one of the above (1) to (5), which further contains, as Component (J), an inorganic filler.

(7) The energy ray-curable resin composition according to the above (6), which comprises from 30 to 70 mass % of Component (A), from 10 to 60 mass % of Component (B), from 2 to 30 mass % of Component (C), from 2 to 50 mass % of Component (D), from 0.01 to 15 mass % of Component (E), from 0.01 to 5 mass % of Component (F), from 0 to 30 mass % of Component (G), from 0 to 15 mass % of Component (H) and from 0 to 7 mass % of Component (I) and which contains from 50 to 300 parts by mass of Component (J) per 100 parts by mass of the total amount of such Components (A) to (I).

(8) The energy ray-curable resin composition according to any one of the above (1) to (7), wherein Component (B) is at least one member selected from the group consisting of benzyl methacrylate and allyl methacrylate.

(9) The energy ray-curable resin composition according to any one of the above (1) to (8), wherein Component (D) is at least one member selected from the group consisting of dimethylol-tricyclodecane diacrylate, dimethylol-tricyclodecane dimethacrylate, trimethylolpropane trimethacrylate and trimethylolpropane triacrylate.

(10) The energy ray-curable resin composition according to any one of the above (1) to (9), wherein Component (G) is at least one member selected from the group consisting of isobornyl methacrylate, isobornyl acrylate, dicyclopentanyl methacrylate, dicyclopentanyl acrylate, 2-methyl-2-adamantyl methacrylate and 2-methyl-2-adamantyl acrylate.

(11) The energy ray-curable resin composition according to any one of the above (1) to (10), wherein Component (H) is at least one member selected from the group consisting of 2-acryloyloxyethyl succinic acid, 2-methacryloyloxyethyl succinic acid, acrylic acid dimmer, 2-methacryloyloxyethyl acid phosphate, 2-acryloyloxyethyl acid phosphate and ω-carboxy-polycaprolactone monoacrylate.

(12) An adhesive comprising an energy ray-curable resin composition as defined in any one of the above (1) to 11).

(13) An assembly bonded by an adhesive comprising an energy ray-curable resin composition as defined in any one of the above (1) to (11).

(14) A cured product having cured an energy ray-curable resin composition as defined in any one of the above (1) to (11).

EFFECTS OF THE INVENTION

The energy ray-curable resin composition of the present invention is made of a resin composition having a specific composition comprising a diene or a hydrogenated diene (meth)acrylate having a molecular weight of from 500 to 5,000, a monofunctional (meth)acrylate having an unsaturated hydrocarbon group of a specific structure via an ester bond, a hydroxyl group-containing (meth)acrylate, a polyfunctional (meth)acrylate, a photopolymerization initiator and an antioxidant, and it is curable by irradiation with an energy ray and yet has a characteristic such that the cure shrinkage during the curing is low, and the adhesion strain of the cured product is little.

Further, the energy ray-curable resin composition of the present invention exhibits, as it has the above-mentioned specific composition, an equally high adhesive strength to various objects to be bonded such as glasses, metals and plastics, and it has good heat resistance and moisture resistance and yet is excellent in rigidity.

BEST MODE FOR CARRYING OUT THE INVENTION

Component (A) in the present invention is a (meth)acrylate having a molecular weight of from 500 to 5,000, of which the main chain backbone is at least one member selected from the group consisting of a polybutadiene, polyisoprene and hydrogenated products thereof and which has at least one (meth)acryloyl group at an end of the main chain backbone or in a side chain. Here, as the molecular weight, a number average molecular weight as calculated as polystyrene, measured by gel permeation chromatography (GPC) is preferably employed.

The main chain backbone of the (meth)acrylate of Component (A) is at least one member selected from the group consisting of a polybutadiene, a polyisoprene, a hydrogenated product of a polybutadiene and a hydrogenated product of a polyisoprene. Preferably, polybutadiene or a hydrogenated product of a polybutadiene is selected, and particularly preferably a polybutadiene is selected.

The microstructure of the polybutadiene is not particularly limited, and it may be a low-cis polybutadiene backbone having a small proportion of 1,4-cis form units, a high-cis polybutadiene backbone having a large proportion of 1,4-cis form units or a 1,2-polybutadiene backbone. However, according to a study by the present inventors, a 1,2-polybutadiene backbone is preferably selected.

In a case where a hydrogenated product of a polybutadiene or a hydrogenated product of a polyisoprene is used, from the viewpoint of the heat resistance and the weather resistance, such a hydrogenation ratio is preferably at least 80%, more preferably at least 85%, particularly preferably at least 90%. Here, the hydrogenation ratio is a ratio of the number of monomer units having hydrogen added to the total number of diene monomer units in the hydrogenated product of a polybutadiene or in the hydrogenated product of a polyisoprene.

The (meth)acrylate of Component (A) has at least one (meth)acryloyl group at an end of the above-mentioned main chain backbone or in a side chain. Particularly preferred is one having (meth)acryloyl groups at both terminals of the main chain backbone.

The molecular weight of the (meth)acrylate of Component (A) is from 500 to 5,000, preferably from 800 to 2,500, particularly preferably from 1,100 to 2,200. If the molecular weight is less than 500, the hardness of a cured product obtainable by irradiating the curable resin composition of the present invention with an energy ray tends to be too low, and it may become difficult to form an adhesive layer. On the other hand, if the molecular weight exceeds 5,000, the viscosity of the obtainable resin composition tends to be too high, and there may be a problem in the workability in e.g. mixing during the production process or in the workability when the resin composition is used for practical application, such being undesirable.

The (meth)acrylate of Component (A) may, for example, be NISSO-PB TEAI-1000 (both terminal acrylate-modified hydrogenated butadiene oligomer) manufactured by NIPPON SODA CO., LTD. or NISSO-PB TE-2000 (both terminal methacrylate-modified butadiene oligomer) manufactured by NIPPON SODA CO., LTD.

Component (B) is a monofunctional (meth)acrylate having a $C_{2-8}$ unsaturated hydrocarbon group via an ester bond. The $C_{2-8}$ unsaturated hydrocarbon group is not particularly limited, so long as it is a hydrocarbon group having an unsaturated bond such as a double bond or a triple bond, or an aromatic ring. For example, it may be $C_2$ vinyl group, $C_3$ allyl group, $C_6$ phenyl group or $C_7$ benzyl group. Particularly preferably, $C_3$ allyl group or $C_7$ benzyl group may, for example, be mentioned. Further, it may be an acrylate or a methacrylate but preferably, methacrylate is selected.

The monofunctional (meth)acrylate of Component (B) may, for example, be benzyl methacrylate, allyl methacrylate, benzyl acrylate or allyl acrylate, preferably benzyl methacrylate or allyl methacrylate, more preferably benzyl methacrylate.

Component (C) is a hydroxyl group-containing (meth)acrylate. The hydroxyl group-containing (meth)acrylate is meant for a monofunctional (meth)acrylate monomer having at least one hydroxyl group in its molecule, and preferably, a monofunctional methacrylate monomer is employed.

The hydroxyl group-containing (meth)acrylate monomer may, for example, be 2-hydroxyethyl(meth)acrylate, 2-hydroxypropyl(meth)acrylate, 2-hydroxybutyl (meth)acrylate, 2-hydroxy-3-phenoxypropyl(meth)acrylate, 2-(meth)acryloyloxyethyl-2-hydroxypropyl phthalate, glycerol mono (meth)acrylate, 1,6-hexanediol mono(meth)acrylate, neopentyl glycol mono(meth)acrylate, 4-hydroxycyclohexyl (meth)acrylate, or 1,4-butanediol mono(meth)acrylate, preferably 2-hydroxyethyl (meth)acrylate, 2-hydroxypropyl (meth)acrylate or 2-hydroxybutyl(meth)acrylate, particularly preferably 2-hydroxyethyl(meth)acrylate, 2-hydroxypropyl (meth)acrylate or 2-hydroxybutyl(meth)acrylate.

Component (D) of the present invention is a polyfunctional (meth)acrylate. The polyfunctional (meth)acrylate of the present invention is meant for a compound having at least two (meth)acryloyl groups in its molecule, and preferably, a polyfunctional methacrylate monomer is employed. The polyfunctional (meth)acrylate may, for example, be a polyfunctional (meth)acrylate having an alicyclic structure such as dimethylol-tricyclodecane di(meth)acrylate or dimethylolcyclohexane di(meth)acrylate, a polyfunctional (meth)acrylate having an aromatic ring structure such as ethylene oxide-added bisphenol A di(meth)acrylate, ethylene oxide-added bisphenol F di(meth)acrylate, propylene oxide-added bisphenol A di(meth)acrylate or propylene oxide-added bisphenol F di(meth)acrylate, or a polyfunctional (meth)acrylate having an aliphatic branched structure such as trimethylolpropane tri(meth)acrylate. Among them, it is preferred to use a polyfunctional (meth)acrylate having an alicyclic structure such as dimethylol-tricyclodecane di(meth)acrylate, or a polyfunctional (meth)acrylate having an aliphatic branched structure such as trimethylolpropane tri(meth)acrylate, and it is particularly preferred to use a polyfunctional (meth)acrylate having a $C_{6-12}$ alicyclic structure such as dimethylol-tricyclodecane di(meth)acrylate.

Component (E) is a photopolymerization initiator. As a photopolymerization initiator, an ultraviolet polymerization initiator or a visible light polymerization initiator may, for example, be mentioned, and either one may be used without any particular restriction. The ultraviolet polymerization initiator includes, for example, a benzoin type, a benzophenone type or an acetophenone type, and the visible light polymerization initiator includes, for example, an acylphosphine oxide type, a thioxanthone type, a metallocene type or a quinone type.

Specifically, the photopolymerization initiator may, for example, be benzophenone, 4-phenylbenzophenone, a benzoylbenzoic acid, 2,2-diethoxyacetophenone, bisdiethylaminobenzophenone, benzyl, benzoin, benzoyl isopropyl ether, benzyl dimethyl ketal, 1-hydroxycyclohexylphenyl ketone, thioxanthone, 1-(4-isopropylphenyl)-2-hydroxy-2-methyl-propan-1-one, 1-(4-(2-hydroxyethoxy)-phenyl)-2-hydroxy-2-methyl-1-propan-1-one, 2-hydroxy-2-methyl-1-phenyl-propan-1-one, camphorquinone, 2,4,6-trimethylbenzoyldiphenylphosphine oxide, bis(2,4,6-trimethylbenzoyl)-phenylphosphine oxide, 2-methyl-1-(4-(methylthio)phenyl)-2-morpholinopropan-1-one, 2-benzyl-2-dimethylamino-1-(4-morpholinophenyl)-1-butanone-1, or bis(2,6-dimethoxybenzoyl)-2,4,4-trimethyl-pentylphosphine oxide.

Component (F) is an antioxidant. As the antioxidant, a phenol type or a hydroquinone type may be used, and a phenol type is preferably employed. The antioxidant may, for example, be β-naphthoquinone, 2-methoxy-1,4-naphthoquinone, methyl hydroquinone, hydroquinone, 2,2-methylene-bis(4-methyl-6-tert-butylphenol), catechol, hydroquinone monomethyl ether, mono-tert-butyl hydroquinone, 2,5-di-tert-butyl hydroquinone, p-benzoquinone, 2,5-diphenyl-p-benzoquinone, 2,5-di-tert-butyl-p-benzoquinone, picric acid, citric acid, phenothiazine, tert-butyl catechol, 2-butyl-4-hydroxy anisole, or 2,6-ditert-butyl-p-cresol.

The energy ray-curable resin composition of the present invention comprises the above-mentioned Components (A) to (F) as essential components. The composition comprising the above Components (A) to (F) exhibits characteristics such that when irradiated with an energy ray, it will be cured, and the cured product has high rigidity and good heat resistance and moisture resistance and exhibits a high bond strength equally to various objects to be bonded, and shrinkage on curing is low at the time of the above curing.

Further, the energy ray-curable resin composition of the present invention may contain, as Component (G), a monofunctional (meth)acrylate having a $C_{9-12}$ saturated alicyclic hydrocarbon group via an ester bond. The $C_{9-12}$ saturated alicyclic hydrocarbon group may, for example, be a dicyclopentanyl group, an isobornyl group or an adamantyl group, and particularly preferably, a dicyclopentanyl group or an isobornyl group may, for example, be mentioned. Further, with respect to an acrylate and a methacrylate, a methacrylate is preferably selected.

The monofunctional (meth)acrylate having a $C_{9-12}$ saturated alicyclic hydrocarbon group via an ester bond may, for example, be 2-methyl-2-adamantyl(meth)acrylate, 2-ethyl-2-adamantyl(meth)acrylate, isobornyl (meth)acrylate, dicyclopentanyloxyethyl(meth)acrylate or dicyclopentanyl (meth)acrylate, preferably isobornyl (meth)acrylate, dicyclopentanyl(meth)acrylate or 2-methyl-2-adamantyl (meth)acrylate, further preferably isobornyl(meth)acrylate.

In the present invention, when the mass amount of Component (B) in the energy ray-curable resin composition (the mass % of Component (B) when the total components of the energy ray-curable resin composition are regarded as 100%, the same applies hereinafter) is represented by X, and the mass amount of Component (G) is represented by Y, X/Y is particularly preferably within a range of $0.5 \leq X/Y \leq 15$, whereby the energy ray-curable resin composition of the present invention tends to show a particularly high value of the bond strength to various objects to be bonded. More preferably, it is within a range of $1 \leq X/Y \leq 10$.

For the purpose of further improving the adhesion to a metal surface, it is preferred that the energy ray-curable resin composition of the present invention further contains, as Component (H), a (meth)acrylate having a carboxyl group or a phosphate group.

The (meth)acrylate having a phosphate group may, for example, be (meth)acryloyloxyethyl acid phosphate or (meth)acryloyloxyethylpolyethylene glycol acid phosphate.

The (meth)acrylate having a carboxyl group may, for example, be maleic acid, fumaric acid, ω-carboxy-polycaprolactone mono(meth)acrylate, phthalic acid monohydroxyethyl(meth)acrylate, (meth)acrylic acid dimer, β-(meth)acryloyloxyethyl hydrogen succinate, 2-acryloloxyethyl succinate or 2-methacryloyloxyethyl succinate.

Among (meth)acrylates having a carboxyl group or a phosphate group, particularly preferred is 2-arcyloloxyethyl succinate, 2-methacyloyloxyethyl succinate, acrylic acid dimer, 2-methacryloyloxyethyl acid phosphate, 2-acryloyloxyethyl acid phosphate or ω-carboxy-polycaprolactone monoacrylate. More preferred may, for example, be 2-methacryloyloxyethyl succinate or 2-methacryloyloxyethyl acid phosphate.

For the purpose of further improving the adhesion to a glass surface, the energy ray-curable composition of the present invention may further contain, as Component (I), a silane coupling agent.

The silane coupling agent may, for example, be γ-chloropropyltrimethoxysilane, vinyl-trimethoxysilane, vinyl trichlorosilane, vinyl triethoxysilane, vinyl-tris(β-methoxyethoxy)silane, γ-methacryloxypropyltrimethoxysilane, γ-acryloxypropyltrimethoxysilane, β-(3,4-epoxycyclohexyl)ethyltrimethoxysilane, γ-glycidoxypropyltrimethoxysilane γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane or γ-ureidepropyltriethoxysilane. Preferred is, for example, γ-methacryloxypropyltrimethoxysilane or γ-acryloxypropyltrimethoxysilane.

For the purpose of further imparting rigidity and low shrinkage on curing, the energy ray-curable resin composition of the present invention may further contain, as Component (J), an inorganic filler.

The inorganic filler may, for example, be a silica powder such as quartz, quartz glass, molten silica or spherical silica, an oxide such as spherical alumina, pulverized alumina, magnesium oxide, beryllium oxide or titanium oxide, a nitride such as boron nitride, silicon nitride or aluminum nitride, a carbide such as silicon carbide, a hydroxide such as aluminum hydroxide or magnesium hydroxide, a metal such as copper, silver, iron, aluminum, nickel or titanium, or an alloy, or a carbon filler such as diamond or carbon. These inorganic fillers may be used alone or in combination as a mixture of two or more of them. The inorganic filler is preferably a silica powder such as quartz, quartz glass, molten silica or spherical silica, more preferably spherical silica, since it is readily available and in view of the filling property to an acrylic resin.

With respect to Components (A) to (I), the energy ray-curable resin composition of the present invention is preferably made to be a composition comprising from 30 to 70 mass %, preferably from 40 to 60 mass %, or Component (A); from 10 to 60 mass %, preferably from 12 to 45 mass %, of Component (B); from 20 to 30 mass %, preferably from 40 to 20 mass %, of Component (C); from 2 to 50 mass %, preferably from 4 to 30 mass %, of Component (D); from 0.01 to 15 mass %, preferably from 0.5 to 10 mass %, of Component (E); from 0.01 to 5 mass %, preferably from 0.05 to 3 mass %, of Component (F); from 0 to 30 mass %, preferably from 3 to 25 mass %, or Component (G); from 0 to 15 mass %, preferably from 2 to 10 mass %, of Component (H); and from 0 to 7 mass %, preferably from 1 to 5 mass %, of Component (I).

To 100 parts by mass of such a composition, Component (J) is particularly preferably incorporated in an amount of from 50 to 300 parts by mass, preferably from 100 to 250 parts by mass, whereby the rigidity of a cured product obtainable by irradiation with an energy ray will be particularly high, the heat resistance and moisture resistance will be better and yet the shrinkage on curing tends to be particularly low and the composition tends to show a particularly high bond strength equally to various objects to be bonded.

Further, to the energy ray-curable resin composition of the present invention, commonly employed additives, such as various elastomers such as acrylic rubber, urethane rubber, etc., graft copolymers such as a methyl methacrylate-butadiene-styrene graft copolymer, an acrylonitrile-butadiene-styrene graft copolymer, etc., a solvent, a bulking agent, a reinforcing material, a plasticizer, a thickener, a dye, a pigment, a flame retardant and a surfactant, may be incorporated within a range not to impair the purpose of the present invention.

EXAMPLES

Now, the present invention will be described in further detail with reference to Examples and Comparative Examples. However, it should be understood that the present invention is by no means thereby restricted. The following compounds were selected for use as the respective components in the blend compositions disclosed in Examples and Comparative Examples.

As the (meth)acrylate of Component (A) having a molecular weight of from 500 to 5,000, which has at least one (meth)acryloyl group at a terminal of the molecule or in a side chain, and which is at least one member selected from the group consisting of a polybutadiene, a polyisoprene and hydrogenated products thereof, (A-1) Terminal acryl-modified polybutadiene (tradename: TE-2000, manufactured by NIPPON SODA CO., LTD.) (number average molecular weight as calculated as polystyrene by GPC: 2,100)

(A-2) Terminal acryl-modified polybutadiene hydrogenated product (tradename: TEAI-1000, manufactured by NIPPON SODA CO., LTD.) (number average molecular weight as calculated as polystyrene by GPC: 1,200)

As the monofunctional (meth)acrylate of Component (B) having a $C_{2-8}$ unsaturated hydrocarbon group via an ester bond, (B-1) Benzyl methacrylate (LITE ESTER BZ, manufactured by KYOEISHA CHEMICAL CO., LTD)

(B-2) Allyl methacrylate (manufactured by MITSUBISHI GAS CHEMICAL COMPANY, INC.)

As the hydroxyl group-containing (meth)acrylate of Component (C), (C-1) 2-hydroxyethyl methacrylate (LITE ESTER HO, manufactured by KYOEISHA CHEMICAL CO., LTD)

As the polyfunctional (meth)acrylate of Component (D), (D-1) Dimethyloltricyclodecane diacrylate (LITE ACRYLATE DCP-A, manufactured by KYOEISHA CHEMICAL CO., LTD)

(D-2) Dimethyloltricyclodecane dimethacrylate (LITE ESTER DCP-M, manufactured by KYOEISHA CHEMICAL CO., LTD)

(D-3) Trimethylolpropane trimethacrylate (LITE ESTER TMP, manufactured by KYOEISHA CHEMICAL CO., LTD)

(D-4) Trimethylolpropane triacrylate (LITE ACRYLATE TMA-A, manufactured by KYOEISHA CHEMICAL CO., LTD)

As the photopolymerization initiator of Component (E), (E-1) Benzyl dimethyl ketal (IRGACURE 651, manufactured by CIBA SPECIALTY CHEMICALS)

(E-2) 1-hydroxycyclohexyl phenyl ketone (IRGACURE 184, manufactured by CIBA SPECIALTY CHEMICALS)

As the antioxidant of Component (F), (F-1) 2,2-methylene-bis(4-methyl-6-tert-butylphenol) (SUMILIZER MDP-S, manufactured by SUMITOMO CHEMICAL CO., LTD)

As the monofunctional (meth)acrylate of Component (G) having a $C_{9-12}$ saturated alicyclic hydrocarbon group via an ester bond, (G-1) Isobornyl methacrylate (LITE ESTER IB-X, manufactured by KYOEISHA CHEMICAL CO., LTD)

(G-2) Dicyclopentanyl methacrylate (FA-513M, manufactured by HITACHI CHEMICAL CO., LTD)

(G-3) 2-methyl-2-adamantyl methacrylate (ADAMANTATE MM, manufactured by IDEMITSU KOSAN CO. LTD.)

As the (meth)acrylate of Component (H) having a carboxyl group or a phosphate group, (H-1) 2-methacryloyloxyethyl succinic acid (LITE ESTER HO-MS, manufactured by KYOEISHA CHEMICAL CO., LTD)

(H-2) 2-methacryloyloxyethyl acid phosphate (LITE ESTER P-1M, manufactured by KYOEISHA CHEMICAL CO., LTD)

(H-3) 2-acryloyloxyethyl succinic acid (LITE ESTER HOM-MS, manufactured by KYOEISHA CHEMICAL CO., LTD)

(H-4) 2-acryloyloxyethyl acid phosphate (LITE ACRYLATE P-1A, manufactured by KYOEISHA CHEMICAL CO., LTD)

(H-5) An acrylic acid dimer (ARONICS M-5600, manufactured by TOAGOSEI CO., LTD.)

(H-6) ω-carboxy-polycaprolactone-monoacrylate (ARONICS M-5300, manufactured by TOAGOSEI CO., LTD.)

As the silane coupling agent of Component (I), (I-1) γ-methacryloxypropyltrimethoxysilane (KMB-503, manufactured by SHIN-ETSU CHEMICAL CO., LTD.)

As the inorganic filler of Component (J), (J-1) Spherical silica (FB-5D, DENKI KAGAKU KOGYO KABUSHIKI KAISHA)

Various physical properties were measured as follows.

Photo-curing conditions: At the time of photo-curing, curing was conducted by a curing device manufactured by FUSION COMPANY employing an electrodeless discharge lamp under such conditions that the cumulative quantity of light with a wavelength of 365 nm was 2,000 mJ/cm$^2$.

Tensile bond strength (1): One end surfaces of two glass fiber-reinforced polyphenylene sulfide (PPS) test specimens (100×25×2.0 mm, GS40 manufactured by TOSOH CORPORATION, containing 40% of glass fiber) were pressed against each other with two TEFLON(registered trademark) spacers of 0.6 mm in thickness×2 mm in width×7 mm in length interposed to form a space of 11 mm in length×0.6 mm in width×2 mm in thickness defined by the two PPS test specimens and the two Teflon (registered trademark) spacers, and an adhesive was cast into the space and cured under the above conditions (bonding area: 22 mm$^2$). After the curing, using the test specimens bonded by the adhesive, the tensile bond strength (1) was measured.

The tensile shear bond strength (unit: MPa) was measured in an environment at a temperature of 23° C. with a humidity of 50% at a tensile speed of 10 mm/min and taken as the tensile bond strength (1).

Tensile bond strength (2): By the above-described method except for using zinc die-cast test specimens (100×25×2.0 mm, ZDC2), test specimens bonded by an adhesive were prepared, and the tensile shear bond strength (unit: MPa) was measured in the same manner as for the tensile bond strength (1) and taken as the tensile bond strength (2).

Evaluation of moisture resistance: Using zinc die-cast test specimens (100×25×2.0 mm, ZDC2), the same test specimens as used for evaluation of the above tensile shear bond strength were prepared, then left to stand in an atmosphere at a temperature of 80° C. with a humidity of 90% for 504 hours, then taken out and left to stand in a room having an atmosphere of 23° C.×50 RH for at least 30 minutes and then, the tensile shear bond strength (unit: MPa) was measured in the same manner as for the tensile bond strength (1).

Cure shrinkage: A resin composition was cured under the above photocuring conditions to prepare a cured sample. The density (the value is represented by K) at 23° C. of this cured product was measured in accordance with JIS K7112 method A. On the other hand, the density (the value is represented by L) at 23° C. of the liquid of the resin composition before curing was measured by means of a specific gravity bottle in accordance with JIS K6833.

$$\text{Cure shrinkage}(\%)=(K-L)/K \times 100$$

Storage elastic modulus: A resin composition was cured under the above photocuring conditions to prepare a cured product sample of 20 mm×5 mm×1 mm. Using this cured product and using a tensile module DMS210 manufactured by SEIKO DENSHI KOGYO K.K., a dynamic viscoelasticity spectrum was measured by a tensile mode by sweeping a temperature under such conditions that the frequency was 1 Hz, and the strain was 0.05%, whereupon a value of the storage elastic modulus E' at 23° C. was obtained.

GPC evaluation: The molecular weight of Component A was measured under the following conditions and obtained as a number average molecular weight as calculated as polystyrene by GPC.

Measuring Conditions

Solvent (mobile phase): THF

Flow rate: 1.0 ml/min

Set temperature: 40° C.

Construction of columns: (total of three columns (theoretical plate number as a whole: 32,000 plates) i.e. one TSK guardcolumn MP(xL)6.0 mm ID×4.0 cm, manufactured by Tosoh Corporation, and two TSK-GEL MULTIPORE-HXL-M 7.8 mm ID×30.0 cm (theoretical plate number: 16,000 plates) manufactured by TOSOH CORPORATION.

Liquid supply pressure: 39 kg/cm$^2$

Detector: RI detector

Examples 1 to 20 and Comparative Example 1 to 4

Resin compositions were prepared by mixing raw materials of the types shown in Tables 1, 2 and 3 to have compositions shown in Tables 1, 2 and 3. With respect to the obtained compositions, measurements of the tensile bond strengths (1) and (2) and the moisture resistance evaluation test were carried out. Further, measurements of the cure shrinkage and the storage elastic modulus were carried out. The results thereof are shown in Tables 1, 2 and 3.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Compositions | A-1 | Mass % based on total amount of Components A to I | 41.6 | | 46.2 | 46.2 | 40.8 | 41.6 | 41.6 | 41.6 | 40.8 | 41.6 |
| | A-2 | | | 41.6 | | | | | | | | |
| | B-1 | | 23.1 | 23.1 | 27.7 | | 22.7 | 23.1 | 23.1 | 23.1 | 22.7 | 23.1 |
| | B-2 | | | | | 27.7 | | | | | | |
| | C-1 | | 13.9 | 13.9 | 9.2 | 9.2 | 13.6 | 13.9 | 13.9 | 13.9 | 13.6 | 13.9 |
| | D-1 | | 13.9 | 13.9 | 9.2 | 9.2 | 13.6 | | | | | |
| | D-2 | | | | | | | 13.9 | | | 13.6 | 13.9 |
| | D-3 | | | | | | | | 13.9 | | | |
| | D-4 | | | | | | | | | 13.9 | | |
| | E-1 | | 0.2 | 0.2 | 0.2 | 0.2 | 0.2 | 0.2 | 0.2 | 0.2 | 0.2 | 0.2 |
| | E-2 | | 2.3 | 2.3 | 2.3 | 2.3 | 2.3 | 2.3 | 2.3 | 2.3 | 2.3 | 2.3 |
| | F-1 | | 0.1 | 0.1 | 0.1 | 0.1 | 0.1 | 0.1 | 0.1 | 0.1 | 0.1 | 0.1 |
| | G-1 | | | | | | | | | | | |
| | G-2 | | | | | | | | | | | |
| | G-3 | | | | | | | | | | | |
| | H-1 | | | | | | 4.5 | | | | | |
| | H-2 | | 2.8 | 2.8 | 2.8 | 2.8 | | 2.8 | 2.8 | 2.8 | | |
| | H-3 | | | | | | | | | | 4.5 | |
| | H-4 | | | | | | | | | | | 2.8 |
| | H-5 | | | | | | | | | | | |
| | H-6 | | | | | | | | | | | |
| | I-1 | | 2.3 | 2.3 | 2.3 | 2.3 | 2.3 | 2.3 | 2.3 | 2.3 | 2.3 | 2.3 |
| | J-1 | | 222 | 222 | 185 | 185 | 218 | 222 | 222 | 222 | 218 | 222 |
| Evaluated Properties | X-Y ratio | | — | — | — | — | — | — | — | — | — | — |
| | Cure shrinkage | % | 4.1 | 4.7 | 4.1 | 3.9 | 4.2 | 4.0 | 3.8 | 3.8 | 4.2 | 4.0 |
| | Storage elastic modulus | MPa | 5600 | 5800 | 4900 | 4900 | 5100 | 5800 | 6200 | 6100 | 5000 | 5700 |
| | Tensile bond strength (1) | MPa | 8.3 | 7.2 | 8.4 | 7.2 | 6.8 | 7.4 | 6.4 | 6.3 | 6.7 | 7.3 |
| | Tensile bond strength (2) | MPa | 23.1 | 21.5 | 24.0 | 24.1 | 22.9 | 25.0 | 22.3 | 21.9 | 23.3 | 23.5 |
| | Evaluation of moisture resistance | MPa | 20.2 | 18.5 | 22.5 | 23.1 | 26.7 | 23.7 | 21.2 | 20.2 | 25.7 | 22.2 |

TABLE 2

| | | | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|---|
| Compositions | A-1 | Mass % based on total amount of Components A to I | 40.8 | 40.8 | 44.6 | 44.6 | 44.6 | 44.6 | 44.6 | 44.6 | 44.6 | 42.7 |
| | A-2 | | | | | | | | | | | |
| | B-1 | | 22.7 | 22.7 | 35.7 | 31.2 | 26.8 | 22.3 | 13.4 | 31.2 | 31.2 | 23.7 |
| | B-2 | | | | | | | | | | | |
| | C-1 | | 13.6 | 13.6 | 4.5 | 4.5 | 4.5 | 4.5 | 4.5 | 4.5 | 4.5 | 14.2 |
| | D-1 | | | | | 4.5 | 4.5 | 4.5 | 4.5 | 4.5 | 4.5 | 14.2 |
| | D-2 | | 13.6 | 13.6 | | | | | | | | |
| | D-3 | | | | | | | | | | | |
| | D-4 | | | | | | | | | | | |
| | E-1 | | | 0.2 | 0.2 | | | | | | | 0.2 |
| | E-2 | | 2.3 | 2.3 | 5.8 | 5.8 | 5.8 | 5.8 | 5.8 | 5.8 | 5.8 | 2.4 |
| | F-1 | | 0.1 | 0.1 | 0.1 | 0.1 | 0.1 | 0.1 | 0.1 | 0.1 | 0.1 | 0.1 |
| | G-1 | | | | | 4.5 | 8.9 | 13.4 | 22.3 | | | |
| | G-2 | | | | | | | | | 4.5 | | |
| | G-3 | | | | | | | | | | 4.5 | |
| | H-1 | | | | | | | | | | | |
| | H-2 | | | | 2.7 | 2.7 | 2.7 | 2.7 | 2.7 | 2.7 | 2.7 | |
| | H-3 | | | | | | | | | | | |
| | H-4 | | | | | | | | | | | |
| | H-5 | | 4.5 | | | | | | | | | |
| | H-6 | | | 4.5 | | | | | | | | |
| | I-1 | | 2.3 | 2.3 | 2.2 | 2.2 | 2.2 | 2.2 | 2.2 | 2.2 | 2.2 | 2.4 |
| | J-1 | | 218 | 218 | 178 | 178 | 178 | 178 | 178 | 178 | 178 | 228 |
| Evaluated Properties | X-Y ratio | | — | — | — | 7.0 | 3.0 | 1.7 | 0.6 | 7.0 | 7.0 | — |
| | Cure shrinkage | % | 4.1 | 4.2 | 4.1 | 3.7 | 3.6 | 3.5 | 3.3 | 3.4 | 3.2 | 4.2 |
| | Storage elastic modulus | MPa | 5000 | 5100 | 5100 | 5200 | 5300 | 5400 | 5600 | 5300 | 5500 | 5300 |
| | Tensile bond strength (1) | MPa | 6.8 | 6.6 | 8.3 | 13.1 | 12.7 | 11.1 | 9.7 | 12.5 | 12.2 | 8.1 |
| | Tensile bond strength (2) | MPa | 21.6 | 22.8 | 24.2 | 40.5 | 38.1 | 33.3 | 31.2 | 39.2 | 39.6 | 15.5 |
| | Evaluation of | MPa | 23.3 | 23.9 | 22.4 | 38.2 | 37.5 | 33.2 | 32.2 | 39.5 | 39.9 | 16.7 |

TABLE 2-continued

| | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| moisture resistance | | | | | | | | | | |

TABLE 3

| | | | Comp. Ex. 1 | Comp. Ex. 2 | Comp. Ex. 3 | Comp. Ex. 4 |
|---|---|---|---|---|---|---|
| Compositions | A-1 | Mass % based on total amount of Components A to I | 44.6 | 44.6 | 44.6 | 44.6 |
| | A-2 | | | | | |
| | B-1 | | | 40.1 | 35.7 | |
| | B-2 | | | | | |
| | C-1 | | 4.5 | | 8.9 | 4.5 |
| | D-1 | | 4.5 | 4.5 | | 40.1 |
| | D-2 | | | | | |
| | D-3 | | | | | |
| | D-4 | | | | | |
| | E-1 | | | | | |
| | E-2 | | 5.8 | 5.8 | 5.8 | 5.8 |
| | F-1 | | 0.1 | 0.1 | 0.1 | 0.1 |
| | G-1 | | 35.7 | | | |
| | G-2 | | | | | |
| | G-3 | | | | | |
| | H-1 | | | | | |
| | H-2 | | 2.7 | 2.7 | 2.7 | 2.7 |
| | H-3 | | | | | |
| | H-4 | | | | | |
| | H-5 | | | | | |
| | H-6 | | | | | |
| | I-1 | | 2.2 | 2.2 | 2.2 | 2.2 |
| | J-1 | | 178 | 178 | 178 | 178 |
| Evaluated properties | X-Y ratio | | — | — | — | — |
| | Cure shrinkage | % | 3.2 | 5.1 | 5.5 | 4.9 |
| | Storage elastic modulus | MPa | 5600 | 3500 | 3100 | 6000 |
| | Tensile bond strength (1) | MPa | 2.1 | 2.5 | 2.9 | 0.5 |
| | Tensile bond strength (2) | MPa | 5.2 | 7.7 | 8.2 | 2.1 |
| | Evaluation of moisture resistance | MPa | 1.1 | 1.2 | 1.1 | 0.3 |

INDUSTRIAL APPLICABILITY

The energy ray-curable resin composition of the present invention exhibits equally high bond strength to various objects to be bonded such as glasses, metals and plastics and has good heat resistance and moisture resistance, and it also has a characteristic that it is excellent in rigidity. Thus, it is applicable to bonding or fixing glass materials to each other, glass and metal, glass and ceramic, glass and plastic, plastics to each other, plastic and metal, and plastic and ceramic. Further, it has a characteristic such that the cure shrinkage is particularly low, and adhesion strain is little, and it can be suitably used for an application to bond or fix components to each other in the optoelectronics field where the high performance of instruments is in progress. It is thus industrially very useful.

The entire disclosure of Japanese Patent Application No. 2005-159146 filed on May 31, 2005 including specification, claims and summary is incorporated herein by reference in its entirety.

The invention claimed is:

1. An energy ray-curable resin composition, comprising based on total mass:

from 30 to 70 mass % of a (meth)acrylate having a molecular weight of from 500 to 5,000, a main chain backbone of at least one member selected from the group consisting of a polybutadiene, a polyisoprene and hydrogenated products thereof, and at least one (meth)acryloyl group at an end of the main chain backbone or in a side chain (Component A);

from 10 to 60 mass % of a monofunctional (meth)acrylate having a $C_{2-8}$ unsaturated hydrocarbon group via an ester bond (Component B);

from 2 to 30 mass % of a hydroxyl group-containing (meth)acrylate (Component C);

from 2 to 50 mass % of a polyfunctional (meth)acrylate (Component D);

from 0.01 to 15 mass % of a photopolymerization initiator (Component E); and from 0.01 to 5 mass % of an antioxidant (Component F).

2. The energy ray-curable resin composition according to claim 1, which further comprises, as Component (G), a monofunctional (meth)acrylate having a $C_{9-12}$ saturated alicyclic hydrocarbon group via an ester bond.

3. The energy ray-curable resin composition according to claim 2, wherein a ratio X/Y of mass amount X of Component (B) to mass amount Y of Component (G) is within a range of $0.5 \leq X/Y \leq 15$.

4. The energy ray-curable resin composition according to claim 2, which further comprises, as Component (H), a (meth)acrylate having a carboxyl group or a phosphate group.

5. The energy ray-curable resin composition according to claim 4, which further comprises, as Component (I), a silane coupling agent.

6. The energy ray-curable resin composition according to claim 5, which further comprises, as Component (J), an inorganic filler.

7. The energy ray-curable resin composition according to claim 6, which comprises from 0.01 to 5 mass % of Component (F), from 0 to 30 mass % of Component (G), from 0 to 15 mass % of Component (H) and from 0 to 7 mass % of Component (I), and from 50 to 300 parts by mass of Component (J) per 100 parts by mass of the total amount of such Components (A) to (I).

8. The energy ray-curable resin composition according to claim 1, wherein Component (B) is at least one member selected from the group consisting of benzyl methacrylate and allyl methacrylate.

9. The energy ray-curable resin composition according to claim 1, wherein Component (D) is at least one member selected from the group consisting of dimethylol-tricyclodecane diacrylate, dimethylol-tricyclodecane dimethacrylate, trimethylolpropane trimethacrylate and trimethylolpropane triacrylate.

10. The energy ray-curable resin composition according to claim 2, wherein Component (G) is at least one member selected from the group consisting of isobornyl methacrylate, isobornyl acrylate, dicyclopentanyl methacrylate, dicyclopentanyl acrylate, 2-methyl-2-adamantyl methacrylate and 2-methyl-2-adamantyl acrylate.

11. The energy ray-curable resin composition according to claim 4, wherein Component (H) is at least one member selected from the group consisting of 2-acryloyloxyethyl succinic acid, 2-methacryloyloxyethyl succinic acid, acrylic acid dimmer, 2-methacryloyloxyethyl acid phosphate, 2-acryloyloxyethyl acid phosphate and ω-carboxy-polycaprolactone monoacrylate.

12. An adhesive comprising the energy ray-curable resin composition according to claim 1.

13. An assembly bonded by the adhesive according to claim 12.

14. A cured product comprising the energy ray-curable resin composition according to claim 1, which has been cured.

* * * * *